Patented Sept. 4, 1951

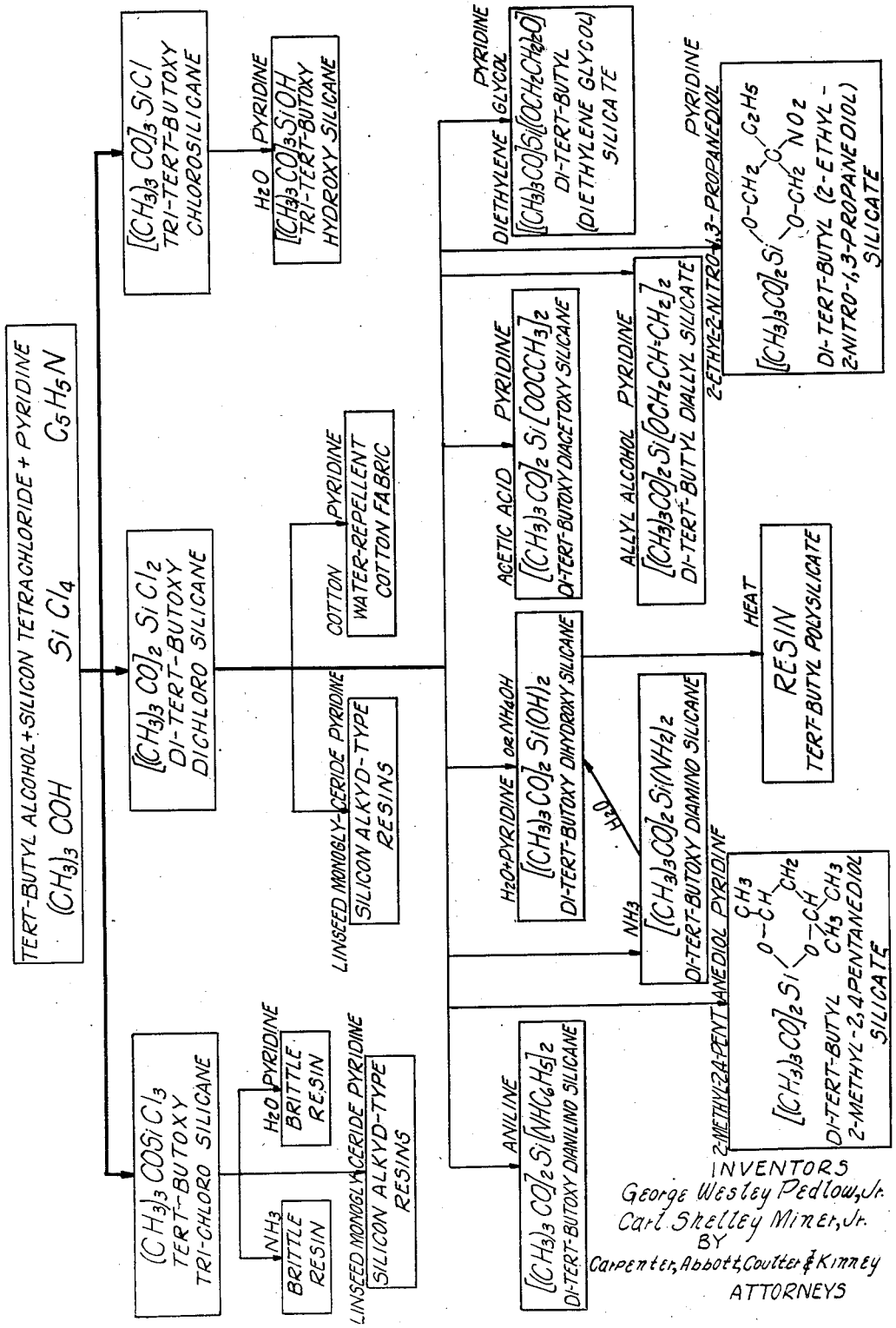

2,566,957

UNITED STATES PATENT OFFICE 2,566,957

TERTIARY-ALKOXY CHLOROSILANES

George Wesley Pedlow, Jr., Easton, Pa., and Carl Shelley Miner, Jr., Winnetka, Ill., assignors to Minnesota Mining & Manufacturing Company, St. Paul, Minn., a corporation of Delaware Application May 6, 1946, Serial No. 667,596

6 Claims. (Cl. 260—448.8)

This application is a continuation-in-part of our copending application Serial No. 470,904, filed December 31, 1942.

The present invention relates to organic silicon compounds and to products or articles involving the same, and to methods for producing such compounds. Preferred examples of the organic silicon compounds in question may be regarded as derivatives of silicon tetrachloride, $SiCl_4$ (which is derivable from silica, $SiO_2$), in which at least one but not more than three of the chlorine atoms is each replaced by an organic radical, most particularly a tertiary-alkoxy radical, yielding compounds such as $(RO)_2SiCl_2$, in which the two R groups may be the same or different, at least one R ordinarily being a tertiary alkyl (or substituted alkyl) group, and where the compounds in question have certain special properties and novel characteristics and/or are adapted for new and valuable uses. The invention as a whole will be more fully explained hereinafter.

Heretofore others have produced certain organic silicon-containing products, starting with silicon tetrachloride, $SiCl_4$. Silicon tetrachloride is a chemical product which has long been known. It can readily be produced in different ways including, by blowing chlorine through a tower packed with sand and coke and of controlled temperature and other conditions. Thus silicon tetrachloride is a readily available material.

One material which has been known for quite some time, and which is derivable from silicon tetrachloride, is ethyl ortho-silicate, i. e. $(C_2H_5O)_4Si$, which may also be referred to as tetra-ethoxy-silicane, or, according to more modern nomenclature, as tetra-ethoxysilane. This can be produced by the reaction of silicon tetrachloride and ethyl alcohol under certain conditions, so that the ethoxy radical replaces the chlorine and HCl is evolved. This reaction has not proved difficult because the hydrogen chloride does not react readily with ethyl alcohol. In fact, HCl does not react readily with primary alcohols in general.

However, hydrogen chloride is more reactive with secondary alcohols, and extremely reactive with tertiary alcohols. Difficulties with the reaction, together with lack of commercial interest, apparently acted as a deterrent to the production of interaction products of silicon tetrachloride and secondary alcohols.

No reactions between tertiary alcohols and $SiCl_4$ to produce either tert-alkoxy chlorosilanes, or any analogous compounds, have heretofore been effected, to the best of our knowledge.

Certain procedures have heretofore been employed in attempts to produce certain organic compounds of silicon. The Wurtz reaction has been applied in the preparation of diphenyl dichloro silicane from phenyl chloride and silicon tetrachloride in the presence of metallic sodium, with yields of only 15-20 percent of theoretical. The expensive and hazardous Grignard reaction has apparently been somewhat more successfully employed in producing alkyl silicon halides; note, for example, Eugene G. Rochow Patents Nos. 2,258,218, 2,258,219, 2,258,220, 2,258,221 and 2,258,222. These prior art compounds all contained a carbon to silicon (—C—Si—) linkage.

We have now discovered an important class of organic-silicon compounds which have a carbon-oxygen-silicon (—C—O—Si—) linkage, which are readily prepared by an economical and safe process, and which do not have the short-comings of previously known organic silicon compounds such as the normal alkyl ortho-silicates or normal alkoxy chlorosilanes. We prepare these novel compounds by employing a tertiary alcohol, e. g. tertiary-butyl alcohol or tertiary-amyl alcohol, for reaction with silicon tetrachloride under particular conditions which avoid the undesirable production of tertiary-butyl chloride, or the like, plus $SiO_2$. Insofar as we know, no one prior to our invention has ever reacted a tertiary alcohol with silicon tetrachloride so as to produce and isolate organic silicon compounds such as we have been able to produce. We have, furthermore, been able to carry out our operations with good yield (e. g. 80 percent or better) so as to replace two chlorine atoms of the silicon tetrachloride, instead of all four chlorine atoms, as in the making of ethyl orthosilicate, $(C_2H_5O)_4Si$, and other orthosilicates. By employing different conditions we can also replace either one or three chlorine atoms, as desired.

We have produced various compounds of the type just referred to, including, for example, di-tertiary-butoxy dichloro silicane,

di-tertiary-amoxy dichloro silicane,

and bis (di-chloro-tertiary-butoxy) dichloro silicane, $[(CH_2Cl)_2C(CH_3)O]_2SiCl_2$. These compounds can be hydrolyzed under controlled alkaline conditions, e. g. in the presence of aqueous ammonia or aqueous pyridine, to remove the chlorine atoms and to yield alkoxy silicanes which latter are resistant to neutral or alkaline hydrolysis. The last mentioned compounds may be di-tertiary-alkoxy di-hydroxy silicanes, e. g. [(CH₃)₃CO]₂Si(OH)₂ or some variation or dehydration product thereof. In some cases the resulting compound, depending on the manner of hydrolysis of the alkoxy chloro silane, may have a molecular formula of generally the following type:

[(CH₃)₃CO]₂(OH)Si—O—Si(OH)[OC(CH₃)₃]₂

Insofar as we are aware no one prior to our invention ever produced a tertiary alkoxy silicane or other organic-silicon compound of any type (e. g. a tertiary alkoxy chloro silicane) which could be hydrolyzed to produce a compound having alkoxy groups attached to silicon, which latter compound is resistant to neutral and to alkaline hydrolysis; neither was there ever produced, insofar as we are aware, a tertiary alkoxy silicane containing one or more other groups or atoms (in addition to the tert-alkoxy group or groups), and which compound is stable to ordinary neutral or alkaline hydrolysis.

It is an object of our invention to produce alkoxy silicanes, especially tertiary-alkoxy silicanes, of the type above indicated, which can be hydrolyzed to produce the corresponding alkoxy silicon compounds which are resistant both to neutral and to alkaline hydrolysis. It is also an object of our invention to produce alkoxy silicanes, having chlorine and/or one or more other groups attached to silicon, in addition to the alkoxy group or groups, which compounds, upon hydrolysis, yield products which are stable against neutral and alkaline hydrolysis. Employing compounds as above indicated, e. g. di-tertiary-alkoxy dichloro silicanes, as intermediates and producing other compounds and/or treated articles therefrom, and such resulting compounds and/or treated articles, constitute further objects and advantages hereof. These and other objects and advantages will appear from the description taken as a whole.

Illustrative and advantageous procedures for preparing our tertiary-alkoxy chloro silicanes will now be given. However, it will be understood that our novel products are contemplated irrespective of the particular method of production described.

EXAMPLE I

*Process for the manufacture of di-tert-amoxy dichloro silicane*

Materials to be employed and proportions:

| Material | Weights | Moles |
|---|---|---|
| | Parts | |
| Silicon tetrachloride | 510 | 3.00 |
| Pyridine | 498 | 6.33 |
| Tertiary-amyl alcohol | 528 | 6.00 |
| Benzene (as solvent) | 1,050 | |
| Benzene (for washing C₅H₅N.HCl) | 1,100 | |

The benzene and silicon tetrachloride are placed in the reaction vessel, preferably glass lined, and cooled to about 10° C. by means of brine or other heat exchange medium. While stirring the solution, the pyridine is slowly added, the temperature being kept below 20° C. during the addition. The addition of the pyridine requires a substantial period of time, e. g. from 1 to 2 hours, depending on the efficiency of the cooling system. Throughout the entire addition the pyridine and silicon tetrachloride react to form a white precipitate which toward the end forms a fairly thick paste with the benzene. The formation of a similar white precipitate on the walls of the reaction vessel as a result of the interaction of the vapors of the reactants can be reduced to a minimum by having the pyridine inlet extend to within a few inches of the surface of the benzene. After addition of the pyridine is complete the mixture is stirred, e. g. an additional 15 minutes, more or less.

The tertiary amyl alcohol is then added, all at once. The temperature rises slowly at first, but once above about 30° C. it rises rather quickly. Unless the dimensions of the reaction vessel are sufficiently restricted, it is desirable to employ internal cooling coils or elements, so that loss of material due to overheating will be avoided. It has been found convenient to allow the temperature to rise to about 40–45° C. then, by controlled cooling, it is kept at this temperature until the reaction subsides. This requires about 1.5 to 2 hours, more or less. The mixture is then heated slowly over a period of about 45 minutes to reflux temperature. The slow heating tends to form a granular pyridine hydrochloride which lends itself well to subsequent filtration. Refluxing is then continued for about two hours, to insure completion of the reaction. It is then cooled and filtered to remove the pyridine hydrochloride, recovering both the filtrate and filter cake. What is ordinarily a very slow filtration can be accomplished quickly by forming a bed of a filter-aid such as "Filter Cel" or "Super Cel" on the filtering medium, such as cloth. This can be done by suspending 15–20 parts of the filter-aid in 200–300 parts of benzene and filtering this suspension through the filtering apparatus. The benzene can be used later for washing purposes. The pyridine hydrochloride is substantially freed of filtrate and then washed with benzene until substantially free of the di-tertiary-amoxy dichloro silicane product.

The filtrate and washings are combined and the benzene is distilled off at atmospheric pressure. When there is no further benzene distillate the product is cooled and the distillation continued at reduced pressure, e. g. an absolute pressure of 10 to 100 mm., to separate the di-tertiary-amoxy dichloro silicane product from remaining materials (i. e. products of side reactions, impurities, etc.). The product decomposes when distilled at atmospheric pressure. A glass lined still, suitable for vacuum distillation, may be employed for both the distillation at atmospheric pressure and the subsequent distillation at reduced pressures.

After a small amount of low boiling material (mostly benzene) is removed in the vacuum distillation, the major portion of the product boils at 105° C. at 22 mm. absolute pressure. The distillate is sometimes cloudy with pyridine hydrochloride, but this settles out on standing and has proved to be of no consequence when the product is used in other reactions. About 700 parts by weight (85% of theoretical yield) of di-tert-amoxy dichloro silicane is obtained.

In the preparation of di-tertiary-butoxy dichloro-silicane the process is substantially identical with that above described except that 444 parts by weight (6.0 mols) of tertiary-butyl alcohol are used in place of 528 parts of tertiary-amyl alcohol above indicated. The boiling point of the di-tertiary-butoxy dichloro silicane is 66° C. at 11 mm. absolute pressure.

Similarly, other tertiary alcohols, such as dichloro-tert-butyl alcohol, 1-ethylcyclohexanol, dihydroterpineol, terpineol and linalool, react in like molecular proportions with silicon tetrachloride in the presence of pyridine or equivalent acid-acceptor, yielding respectively: bis (dichloro-tert-butoxy) dichloro silicane, B. P. 173-6° C. at 10 mm.; bis (1-ethylcyclohexoxy) dichloro silicane, B. P. 170-3° C. at 5 mm.; bis (dihydroterpineoxy) dichloro silicane, B. P. 195° C. at 7 mm., and diterpineoxy and dilinalooxy dichloro silicanes which latter two compounds could not be distilled without decomposition at 5 mm. pressure. The average yield was about 75-80% of the theoretical in all cases.

EXAMPLE II

*Procedure for making tri-tertiary-butoxy chloro silicane*

One method of making this compound will be briefly described.

A solution of 98.0 parts of di-tert-butoxy dichloro silicane, 31.6 parts of pyridine and 75 parts of tert-butyl alcohol was allowed to stand in a closed container for 72 hours or until the precipitation of pyridine hydrochloride ceased. The mixture was then filtered, the precipitate washed with benzene, and the filtrate fractionally distilled. Tri-tert-butoxy chloro silicane (55 parts) was collected at 76° C. at 7 mm. pressure.

EXAMPLE IIIa

*Process for making tertiary-butoxy trichloro silicane*

In one method of making tert-butoxy trichloro silicane 37 parts of tert-butyl alcohol were added to the reaction product of 39.5 parts pyridine and 85 parts of silicon tetrachloride in 250 parts of solvent. The reaction was carried out in essentially the same manner as described hereinabove for the preparation of di-tert-amoxy dichloro silicane except for the proportions of reactants as indicated. Upon working up the products the yield of tert-butoxy trichloro silicane averaged about 38% of the theoretical in several runs. In these runs variations in time, temperature and solvent seemed to have little effect on the yield of product.

The above procedure was less satisfactory for the making of tertiary-amoxy trichloro silicane. We found, however, that by changing the order of addition of the reactants we got materially improved yields of tertiary-alkoxy trichloro silicanes. This improved procedure will now be described.

EXAMPLE IIIb

*Improved process for the manufacture of tertiary-butoxy trichloro silicane*

This method involves the slow addition of a mixture of 37 parts (0.5 mol) of tertiary-butyl alcohol and 39.5 parts (0.5 mol) of pyridine to a solution of 200 c. c. of petroleum ether (boiling range 35-60° C.) and 85 parts (0.5 mol) of silicon tetrachloride, cooled to about 17° C. The mixture was kept at this temperature during the addition which required five (5) hours and then it was heated to 30° C. over a four (4) hour period. The reaction mixture stood overnight and was then stirred for five (5) hours at 30° C., filtered and the product distilled. 71.5 parts (0.39 mol) of tertiary-butoxy trichloro silicane (B. P. 70° C. at 87 mm.) was obtained, representing a yield of 69% of the theoretical.

This improved method, when applied to the preparation of tertiary-amoxy trichloro silicane (B. P. 80° C. at 57 mm.), resulted in a 79% yield of this compound. This is an outstanding improvement in yield of this compound over that obtained with the procedure of Example IIIa for making tertiary-alkoxy trichloro silicanes.

In respect to proportions of reactants employed in the procedures for making tertiary-alkoxy trichloro silicanes, and comparing them with the hereinabove described procedure for making di-tertiary-alkoxy dichloro silicanes, it will be noted that the difference does not consist in simply lowering the proportion of alcohol to the silicon tetrachloride, but, however unexpected it may seem, it is also very important that the proportion of pyridine to the silicon tetrachloride be lowered, as illustrated by the proportions given in the respective examples.

This was shown by the observation in the above improved process for preparing tertiary-butoxy trichloro silicane, that if double the quantity of pyridine were used (the quantities of other materials and the condition were otherwise the same) no tertiary-butoxy trichloro silicane was obtained, but instead di-tertiary-butoxy dichloro silicane was produced in a yield of 87% of theoretical based on the quantity of alcohol used. In this example approximately half of the silicon tetrachloride did not enter at all into reaction with the tertiary-butyl alcohol.

It will be understood that the hereinabove examples are intended to be illustrative only, and that the invention is generic to the process (and the resulting product) wherein a tertiary alcohol is caused to react with silicon tetrachloride in the presence of pyridine (as one example of an acid acceptor) and/or with the reaction product of pyridine and silicon tetrachloride, or with an alkoxy trichloro silicane, a di-alkoxy dichloro silicane, or an alkyl or aryl polychlorosilicane, in the presence of pyridine or other acid acceptor, with the production thereby of organic derivatives of silicon tetrachloride in which at least one chlorine atom remains attached to silicon and in which at least one of the original chlorines is replaced by an organic radical having a tertiary carbon atom attached to the silicon atom by means of an intervening oxygen atom. The groups attached to the carbinol carbon of the tertiary alcohol may be aliphatic or aromatic; if aliphatic, they may be saturated or unsaturated, and if cyclic, they can contain a hetero atom such as oxygen in the furan ring or sulfur in the thiophene ring. They can be substituted by additional groups which are unreactive toward silicon tetrachloride such as halogen, nitro, alkoxy, or acetoxy. If aromatic, they can also be substituted with additional groups unreactive toward silicon tetrachloride such as alkyl or any of the groups described above.

The solvent used for the reaction must be substantially inert to reactants and its properties should be such that it can be readily separated from the product. Such solvents include aliphatic or aromatic hydrocarbons, ethers and cyclic ethers, etc., as well as their halogenated derivatives. In some cases it may be desirable to use one of the reactants as a solvent, e. g. pyridine or other tertiary-amine as well as tertiary-butyl alcohol or other tertiary alcohol may be used. However, in general the lower boiling hydrocarbons are preferred because of their low cost, the ease with which the pyridine hydrochloride can be removed from them by filtration, and also the fact that they can be readily separated from the product by distillation.

The order of addition of reactants in many cases (particularly in the preparation of di-tertiary-alkoxy dichloro silicanes) is not a critical point, e. g. di-tertiary-butoxy dichloro silicane may be prepared by the addition of a mixture of tertiary-butyl alcohol and pyridine to silicon tetrachloride in a suitable solvent.

The temperature of the reactions in the hereinabove examples can be varied. Although reaction takes place between silicon tetrachloride and tertiary alcohols in the presence of pyridine at low temperatures it proceeds only slowly below 30° C. The rate increases rapidly as the temperature is increased above about 30° C. and is very fast at the boiling point of benzene. The preferred temperature for the preparation of di-tertiary-alkoxy dichloro silicanes is 45±10° C., since in this range of temperature the rate of reaction is satisfactory and at the same time the reaction can be easily controlled. The amount and time of heating of the reaction mixture after all of the ingredients are present depend largely on the rate of reaction and are not limited to the time and temperature given in the hereinabove examples.

As hereinabove indicated, the alkoxy chloro silicanes described and illustrated hereinabove may advantageously be employed as intermediates in making other materials. A very brief skeleton outline of such derivative materials, prepared by us, is appended hereto as a drawing, to be made a part of this application. It will be understood that this skeleton outline is not intended to be in any way comprehensive, but simply illustrative, and an aid in understanding certain of the products produced in their general relation to each other. It will be noted, for example, that the skeleton outline shown in the appended drawing is all prepared on the basis of compounds derived from tertiary-butyl alcohol with the other reactants. A generally analogous outline could be prepared with compounds derived from tertiary-amyl alcohol and other tertiary alcohols, of which several other illustrations are given hereinabove. It will also be understood that, while the compounds, di-tertiary-butoxy dichloro silicane or tri-tert-butoxy chloro silicane are shown, we also comprehend compounds which contain unlike alkoxy radicals such as tertiary-butoxy tertiary-amoxy dichloro silicane, tertiary-butoxy tertiary-amoxy dichloro-tertiary-butoxy chloro silicane, phenoxy tertiary-butoxy dichloro silicane, ethyl tertiary-butoxy dichloro silicane, normal-butoxy tertiary-butoxy dichloro silicane, and tertiary-butoxy octa-decoxy dichlorosilicane. The two last mentioned compounds are examples of tertiary-alkoxy dichloro silicanes having one non-tertiary (e. g. primary) alkoxy group; and other examples of such compounds are contemplated, the tertiary alkoxy group (or other tertiary carbinoxy group) serving to stabilize the remainder of the molecule against further hydrolysis after removal of the chlorine by hydrolysis.

The physical constants of the mono-tertiary-alkoxy dichloro silicanes listed above have been determined as follows: phenoxy-t-butoxydichlorosilicane, prepared from phenol and excess t-butoxytrichlorosilicane in the presence of pyridine, boiling point 123–126° C. at 20 mm. density 1.147 gms./ml. at 20° C.; ethyl-t-butoxydichlorosilicane, from ethyltrichlorosilicane and tertiary butyl alcohol in the presence of pyridine, boiling point 153–155° C., density 1.027 gm./ml. at 20° C.; normal-butoxy-tertiary-butoxydichlorosilicane, from tertiary-butoxytrichlorosilicane and normal butyl alcohol in the presence of pyridine, boiling point 73–74° C. at 9 mm., density 1.040 gms./ml. at 20° C., analyzed 28.8% hydrolyzable chlorine; t-butoxyoctadecoxydichlorosilicane, from t-butoxytrichlorosilicane and octadecyl alcohol in the presence of pyridine; obtained as a clear amber-colored liquid residue on removal of volatile materials by heating at 135° C. at an absolute pressure of 2 mm. of mercury, found on analysis to contain 16.1% chlorine. The above also sufficiently indicates the preparation of such compounds, when taken with the foregoing examples and the state of the prior art.

Additional products comprehended herein are those derived by reaction of silicon oxychloride or hexachlorodisilane with tertiary alcohols in the presence of an acid acceptor such as pyridine. Silicon oxychloride, $Si_2OCl_6$, is an intermediate in the formation of silicon tetrachloride and undergoes the same general type of reactions as the latter. For example, by reaction of this material with tert-butyl alcohol in various amounts a number of new products may be prepared of which the following are examples:

I. Sym-tetra-tert-butoxy dichloro siloxane.
II. Di-tert-butoxy tetrachloro siloxane.
III. Penta-tert-butoxy chloro siloxane.

(Analogous compounds may be obtained from hexachlorodisilane and tertiary butyl alcohol.) Hydrolysis of I with aqueous pyridine yields tetra-tert-butoxy dihydroxy siloxane which latter is also obtained by hydrolysis of di-tert-butoxy dichloro silicane under special conditions. Hydrolysis of II with aqueous pyridine gives a resin, which is quite similar to the hereinbelow described resin obtained by the hydrolysis of di-tert-butoxy dichloro silicane.

Compounds which distinguish over the prior art in a manner parallel to or analogous to the distinctions possessed by the silicon compounds herein illustrated, but which contain a metal of groups III to V of the periodic table other than silicon, for example boron, titanium, phosphorus, etc., are likewise contemplated.

Also while organic-chlorine-silicon compounds are particularly illustrated, compounds containing a halogen other than chlorine, for example bromine, are also contemplated.

For the sake of providing a concise summary of various illustrative compounds prepared by us in accordance with the present invention, and various physical constants, data and a brief description of each, but not as a limitation on our invention, reference is made to the following table, in which a number of tertiary alkoxy chlorosilanes and other analogous silicon compounds produced from tertiary alcohols are listed.

Conventional abbreviations used herein include the following:

t-BuO, tertiary butoxy, $(CH_3)_3CO-$.
t-AmO, tertiary amoxy, $(C_2H_5)(CH_3)_2CO-$.
b.-/-mm., boiling point, degrees C., at a pressure of ——mm., of mercury.
D, density, grams/ml., at 20° C.
dec., decomposes.

The percentage of active chlorine (removable by hydrolysis) is given as determined by actual analysis (anal.) and as the theoretical percentage (theor.) based on the indicated formula.

| Name | Formula | Phys. Const. | Per Cent Active Cl | Appearance |
|---|---|---|---|---|
| t-butoxy trichloro silicane | t-BuOSiCl$_3$ | b. 70/87 mm., D. 1.176 | anal. 50.5, theor. 51.3 | limpid liquid; fumes in moist air. |
| di-t-butoxy dichloro silicane | (t-BuO)$_2$SiCl$_2$ | b. 66/11 mm., D. 1.034 | anal. 28.9, theor. 29.0 | Do. |
| tri-t-butoxy chloro silicane | (t-BuO)$_3$SiCl | b. 75-9/5 mm., D. 0.937 | anal. 11.8, theor. 12.6 | limpid liquid; does not fume. |
| t-amoxy trichloro silicane | t-AmOSiCl$_3$ | b. 80/57 mm., D. 1.166 | anal. 47.5, theor. 48.1 | limpid liquid; fumes in moist air. |
| di-t-amoxy dichloro silicane | (t-AmO)$_2$SiCl$_2$ | b. 105/22 mm., D. 1.027 | anal. 25.6, theor. 26.0 | Do. |
| tri-t-amoxy chloro silicane | (t-AmO)$_3$SiCl | b. 128-30/15 mm., D. 0.924 | anal. 8.0, theor. 10.9 | limpid liquid; does not fume. |
| bis(dichloro-t-butoxy) dichloro silicane. | (Cl$_2$-t-BuO)$_2$SiCl$_2$ | b. 173-6/10 mm., D. 1.415 | anal. 18.8, theor. 18.5 | sl. viscous liq.; fumes in moist air. |
| bis(1-ethylcyclo-hexoxy) dichloro silicane. | (C$_8$H$_{15}$O)$_2$SiCl$_2$ | b. 170-3/5 mm | anal. 19.5, theor. 20.1 | sl. viscous liquid; fumes. |
| diterpineoxy dichloro silicane. | (C$_{10}$H$_{17}$O)$_2$SiCl$_2$ | dec. | anal. 15.9, theor. 17.6 | Do. |
| bis(dihydroterpineoxy) dichloro silicane. | (C$_{10}$H$_{19}$O)$_2$SiCl$_2$ | b. 195/7 mm | anal. 17.1, theor. 17.5 | Do. |
| dilinalooxy dichloro silicane | (C$_{10}$H$_{17}$O)$_2$SiCl$_2$ | dec. | anal. 17.2, theor. 17.6 | Do. |
| tetra-t-butoxy dichloro siloxane. | (t-BuO)$_2$SiOSi(t-BuO)$_2$ with Cl Cl | b. 145-55/25 mm | anal. 15.6, theor. 16.3 | limpid liquid. |
| di-t-butoxy tetrachloro siloxane. | (t-BuO)SiOSi(t-BuO) with Cl Cl / Cl Cl | b. 100-15/22 mm | anal. 38.3, theor. 39.9 | Do. |
| penta-t-butoxy chloro siloxane. | (t-BuO)$_3$SiOSi(t-BuO)$_2$ with Cl | b. 155-60/20 mm | anal. 8.8, theor. 7.5 | Do. |
| bis(4-acetoxy-2-methyl-2-pentoxy) dichloro silicane. | (C$_8$H$_{15}$O$_2$)$_2$SiCl$_2$ | b. 160-5/5 mm. dec. | anal. 15.4, theor. 17.1 | sl. viscous liquid; fumes. |

In the above table many if not all of the compounds named, when prepared as hereinbefore indicated, on analysis are found to be in sufficiently close agreement with the theoretical values to show that the formulas given are correct. Consideration of the relationship between analytical and theoretical values of the active chlorine as indicated in the table will be helpful in this connection.

In the making of various derivative products from our novel tertiary-alkoxy chloro silicanes, for example as indicated in the attached drawing, it is important to note that in many cases purification of the tertiary-alkoxy chlorosilicane is not necessary and that the derivative may be made directly, often even in the same reaction vessel, with the crude tertiary-alkoxy chloro silicane. To illustrate, the crude di-tertiary-butoxy dichloro silicane (which is made up of about 85% di-tertiary-butoxy dichloro silicane) may be reacted directly with allyl alcohol and pyridine to produce a di-tertiary-butyl diallyl silicate (about 73% yield); or with acetic acid and pyridine to produce di-tertiary-butoxy diacetoxy silicane (76% yield); or with diethylene glycol and pyridine to produce di-tertiary-butyl (diethylene glycol) silicate (90% yield), etc.; the ultimate product in each case may then be purified as desired.

It will be noted that the tertiary-alkoxy silanes and also, more broadly, the tertiary-carbinoxy silanes herein disclosed and illustrated, each include the following molecular structure:

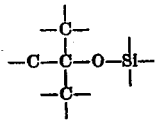

That is, the free valences of the carbonyl carbon are each satisfied by a group in which a carbon atom thereof is joined directly to the carbonyl carbon. It will be seen that the ditertiary alkoxy silanes, and likewise the ditertiary carbinoxy silanes, will accordingly include the following structure:

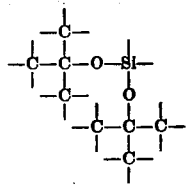

In the case of each of the tritertiary alkoxy silanes, and likewise, more broadly, the tritertiary carbinoxy silanes, the following structure is present:

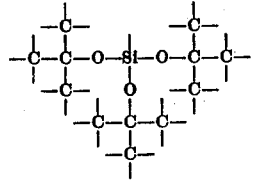

The molecular structure just given hold not only for the case where $C_nH_{2n+1}$ groups are attached to the tertiary carbonyl carbon atom, but also hold where the radicals joined to the carbonyl carbon atoms contain groups such as chlorinated alkyl, aliphatic, aromatic, alicyclic, or heterocyclic groups.

As already indicated, one of the important uses of alkoxy chloro silicanes is as intermediates in the production of other products or as reactants or treating agents in the production of improved articles. Procedures illustrating the utility of our tertiary-alkoxy chloro silicanes and analogous compounds, and the ultimate products resulting therefrom, will now be described briefly.

*Production of a resin from di-tertiary-butoxy dichloro silicane*

When dialkoxy dichloro silicanes and/or alkoxy trichloro silicanes are hydrolyzed in the presence of an acid acceptor, and the hydrolysis products therefrom are further heated, the end-products obtained are of a resinous nature. Various methods can be employed for the production of these resinous materials. For example, a crude di-tert-alkoxy dichloro silicane may be hydrolyzed directly in the original reaction mixture with no preliminary purification of this mixture. This may be accomplished by adding to the crude reaction mixture the required amount of a basic material, such as sodium carbonate dissolved in water. The organic layer is then separated, the solvent removed by distillation and the product heated until the desired degree of hardness is attained.

However, the use of a di-tert-alkoxy dichloro silicane which has been previously purified by distillation is preferred because of the improved control over the purity and properties of the final resin. The following example will serve to illustrate a preferred procedure for the preparation of a resin from di-tert-amoxy dichloro silicane.

In a suitable reaction vessel is placed 150 parts of concentrated aqueous ammonia. The ammonia solution is cooled to 15-20° C. and with good agitation 68 parts of distilled di-tert-amoxy dichloro silicane, B. P. 105° C./22 mm., is gradually added over a 30 minute period keeping the temperature at 15-20° C. Agitation is continued for 15 minutes. The layers which have formed are separated and the aqueous layer extracted with benzene, which is then added to the oil layer. The benzene solution of the product is filtered to remove traces of solid impurities. The filtrate is then distilled at atmospheric pressure until all of the benzene is removed. The product is then heated, the time and temperature of the heating being determined by the properties desired in the final resinous product, which may vary from a viscous oil through a soft, tacky resin to a hard and brittle resin which may be either fusible or infusible. For example, the product of the above reaction was heated at atmospheric pressure at 245-55° C. for 30 minutes and then at the same temperature at 30 mm. pressure for 1 hour. At the end of this treatment the product (37.4 parts) was still fluid before cooling, but at room temperature it was a clear, almost colorless, hard and brittle resin. Analysis of this sample gave a value for silicon of 18.5%.

The conditions of time and temperature in the hydrolysis of the di-tert-amoxy dichloro silicane may be varied greatly from those indicated in the preceding example. For example, such a hydrolysis has been successfully carried out at 70° C. The time in any case need only be sufficient to assure completion of the hydrolysis which occurs much more rapidly as the temperature is increased.

Resins of the type hereinabove indicated may also be prepared by an indirect procedure involving the conversion of a di-tert-alkoxy dichloro silicane to a di-tert-alkoxy diamino silicane by reaction of the former with anhydrous ammonia. The di-tert-alkoxy diamino silicane may be hydrolyzed by water alone, the product is then separated and heated as in the preceding example.

Tert-alkoxy trichloro silicanes are even more readily converted to resins than the di-tert-alkoxy dichloro silicanes. For example, water is gradually added to a cooled pyridine solution of tert-butoxy trichloro silicane to hydrolyze the latter. The product is extracted from the aqueous layer by means of a suitable solvent such as benzene. Evaporation of the solvent leaves a clear, colorless, brittle resin which is similar to the more brittle of the resins derived from the di-tert-alkoxy dichloro silicanes. Other generally parallel reactions and parallel types of products may be prepared by starting with a different specific tertiary-alkoxy chloro silicane, and a whole series of such resins may be produced by employing different alkoxy chloro silicanes. This is somewhat indicated in the skeleton outline shown in the attached drawing and is further indicated by the other particular tertiary-alkoxy chloro silicanes shown in the table presented above.

These resins, when produced under moderate heating conditions, are thermoplastic and are soluble in common organic solvents, e. g. benzene, ethyl alcohol, petroleum ether, etc. However upon long heating these resins ultimately become infusible and also insoluble. The resins are insoluble in and unaffected by water whether in the thermoplastic or the infusible state.

The tertiary-alkoxy chloro silicanes of our invention may also be employed as intermediates in producing various orthosilicates by reaction with alcohols, glycols and the like. Illustrations of orthosilicates and their production are indicated in the outline appearing in the appended drawing; they include di-tertiary-butyl diallyl silicate; di-tert-butyl (2-ethyl-2-nitro-1,3 propanediol) silicate; di-tert-butyl (diethylene glycol) silicate and di-tert-butyl (2-methyl-2-,4-pentanediol) silicate. In making orthosilicates, such as those just illustrated, and others of this general type, the appropriate alcohol or glycol, as the case may be, is added to a mixture of the alkoxy chloro silicane in the presence of excess pyridine, the reactant mixture being diluted with a suitable solvent such as benzene to provide a reaction mixture which can be readily agitated.

These compounds show an unexpected stability toward the action of water, whereas ethyl orthosilicate is very susceptible to hydrolysis even by the moisture vapor of the atmosphere. When ethyl orthosilicate is placed in direct contact with excess water it begins to gel almost immediately and after a short time it is completely hydrolyzed to silica. However, in the novel organic-silicon compounds herein described which contain a group derived from a tertiary alcohol, the resulting compound is remarkably stable toward such hydrolysis. For example, a sample of triethyl tert-amyl silicate was not noticeably affected after direct contact with water for a period of over four months. It also remained unchanged after 6 hours' heating and rapid stirring at 90° C. with 15% aqueous ammonia. As an additional example of the stability of such compounds toward alkaline hydrolysis, we have found that di-n-propyl di-tert-amyl silicate after three hours' refluxing with 20% aqueous sodium hydroxide is less than 15% hydrolyzed. This exemplifies the unique characteristics of silicanes containing tertiary-alkoxy groups, since not only is the tertiary group itself stable to hydrolysis but it also exerts a powerful and unexpected stabilizing influence on primary alkoxy groups in the same molecule.

The products hereinabove described may be fluid or viscous liquids, crystalline solids, or resins which may be soft and sticky or hard and brittle. The liquids and crystalline solids hereinabove described and derived from the tert-alkoxy chloro silicanes are useful as plasticizing agents for natural and/or synthetic resins such as cellulose esters and ethers or the silicon resins herein described. They may be used alone or in admixture with other plasticizers known to those familiar with the art. They may be used as ingredients in extreme pressure lubricants and are also applicable as paint media or as ingredients in waxes and polishes. The resinous products derived from tert-alkoxy chloro silicanes are useful as water-proof coatings for wood, metal, paper, etc., either alone or modified with plasticizers or other plastics. They are also useful as ingredients in adhesives, paints and lacquers.

Di-tertiary-butoxy diacetoxy silicane and analogous compounds may be made in generally the same manner as is indicated in connection with the orthosilicates except that the appropriate organic acid is employed along with the tertiary-alkoxy chloro silicane and pyridine. As an alternative method, these products may be prepared by the reaction of an alkoxy chloro silicane with a salt of the organic acid, e. g. sodium acetate.

Other compounds which can be produced from the tertiary-alkoxy chlorosilanes of this invention may be termed as amino or substituted amino silicanes, and include such materials as di-tertiary-butoxy diamino silicane and di-tertiary-butoxy dianilino silicane, both of which are shown in the accompanying drawing, and are separately described and claimed in our application Ser. No. 663,946, filed on or about April 22, 1946. The former may be made by adding anhydrous ammonia to di-tertiary-butoxy dichloro silicane employing an organic solvent such as benzene as a diluent. The ammonia removes and replaces the chlorine atoms in the di-tertiary-butoxy dichloro silicane molecule.

The procedure for making and the type of reaction involved in making di-tertiary-butoxy dianilino silicane is analogous to that for the product just discussed, except that aniline is employed as the reactant with di-tertiary-butoxy dichloro silicane. It will be understood that by using the same tertiary-alkoxy chloro silicane and other amines or ammonia derivatives, various other derivative products may be made from the alkoxy chlorosilanes, and the like, herein described and claimed. It will also be understood that by using specifically different tertiary-alkoxy chloro silicanes and by using the same or different amines, ammonia or ammonia derivatives, further derivative products may be produced.

Another illustration of the use of our tertiary-alkoxy chloro silicanes in the production of useful derivative products and procedure for producing the same is illustrated by the following:

*Process for the manufacture of silicon alkyd-type resins*

To a solution of 9 parts of pyridine in 20 parts of linseed monoglyceride was added 15 parts of di-tert-amoxy dichloro silicane over a period of 20 minutes. The temperature rose to 54° C. during the reaction. 50 parts of benzene was added and the mixture refluxed 2 hours after which it was cooled, filtered and washed three times with 50 parts of water. The benzene was then distilled off and the viscous product heated to 150° C. for 1 hour in an atmosphere of nitrogen. The yield of product was 22 parts.

Flowouts of this product about 0.0015 inch thick on glass were baked at 150° C. for 1 hour. The resulting film was light yellow, hard, transparent and showed good adherence to the glass. It was about 0.001 inch thick. It showed no indication of exuding, but water caused it to blush. However upon drying it regained its transparency.

A similar, but somewhat softer film was prepared by using an equal amount of di-tert-butoxy dichloro silicane in place of the tertiary-amyl compound in the above reaction. It was also found that the hardness of the resulting film could be appreciably increased by substituting tert-butoxy trichloro silicane for one-third of the di-tert-butoxy dichloro silicane.

It is evident that many changes can be made on the process as given in the above example such as quantities of reactants, time and temperature of reaction etc., in utilizing the tertiary-alkoxy (or other tertiary-carbinoxy) chlorosilanes of our invention.

The above products resemble the familiar linseed modified polyhydric alcohol-polybasic acid alkyds and can be substituted in many instances where the latter are used.

Another illustrative use of tertiary-alkoxy chloro silicanes is exemplified by their use in treating cotton fabrics to give them new and improved characteristics, including particularly water repellency. There follows a description of such procedure:

*Treatment of cloth with tertiary-alkoxy chloro silicanes*

Cotton muslin cloth was immersed in a solution of 100 parts of di-tertiary-amoxy dichloro silicane in 800 parts of pyridine for a period of 20 minutes to 1 hour at a temperature preferably of the order of 80–100° C., with suitable agitation. The cloth was then washed thoroughly to remove the pyridine and unreacted di-tertiary-amoxy dichloro silicane. The di-tertiary-amoxy dichloro silicane apparently formed a chemical product with the cellulose which constitutes the essential material of the cloth, by reacting with the hydroxyl groups of the cellulose molecule, and apparently producing compounds which may be regarded as orthosilicates or analogous thereto.

In addition to the above preferred procedure, similar cloth was treated for different lengths of time at 80° C. and the comparative results of these different time conditions of treatment are shown in the table hereinafter. Included also is the per cent ash of samples of the fabric.

The water repellency of the treated fabric in each case was evaluated by the immersion test described by Slowinske, Amer. Dyestuff Reporter 30, 6 (1941). This involved the immersion of a 3" by 3" weighed, air dried sample in water at 80° F. for 20 minutes. The sample was then placed between blotters, run through a wringer once and weighed. The increase in weight, representing the water absorption, is given in per cent in the following table. The values are the average of two determinations.

TABLE SHOWING COMPARATIVE RESULTS ON CLOTH TREATMENT

[Time of treatment in minutes at 80° C.]

| Temp | 0 | 10 | 20 | 30 | 40 | 60 | 90 |
|---|---|---|---|---|---|---|---|
| Per Cent Moisture absorption | 70 | 65 | 53 | 51 | 34 | 30 | 32 |
| Per Cent Ash | 0.8 | 1.91 | 2.35 | 2.70 | 2.93 | 3.40 | 3.50 |

Hereinabove we have described and illustrated alkoxy chloro silicanes having important novel and useful characteristics. Various other compounds of the same general type, which may be regarded as being derived from tertiary alcohols (whether they contain what is, in straight terminology, regarded as a tertiary-alkoxy group or, more broadly, as a substituted tertiary-alkoxy group, i. e. as a tertiary-carbinoxy group) even if not specifically mentioned herein, are likewise comprehended by this disclosure. In describing derivative products and articles which can be made from the novel tertiary-alkoxy chlorosilanes herein referred to, it will be evident that we have also been obliged to resort to specific illustrations which, of necessity, must be restricted in number. However it will also be clear in this respect that various other derivative products and articles will readily occur to those skilled in the art in the light of the illustrations and the disclosure given herein. In short it will be understood that the various illustrations given herein are exemplary only of the broader and more comprehensive phases of this invention and are not to be regarded as limitative. All embodiments within the scope of this disclosure and/or of the appended claims, which distinguish over the prior art, are contemplated.

What we claim is:

1. Chemical compounds having the molecular formula:

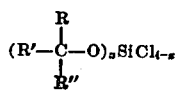

where R is a monovalent carbinyl radical, R' is any monovalent carbinyl radical and R'' is any monovalent carbinyl radical and $x$ is an integer from 1 to 3.

2. A tertiary alkoxy chloro silicane.
3. Di-tertiary alkoxy dichloro silicanes.
4. Di-tertiary-butoxy dichloro silicane.
5. Bis(dichloro-tertiary-butoxy) dichloro silicane.
6. An article of manufacture having a water-repellent surface, said water-repellency resulting from a treatment including contact with a tertiary alkoxy chlorosilane.

GEORGE WESLEY PEDLOW, Jr.
CARL SHELLEY MINER, Jr.

REFERENCES CITED

The following references are of record in the file of this patent:

UNITED STATES PATENTS

| Number | Name | Date |
|---|---|---|
| 1,918,338 | Kaufmann | July 18, 1933 |
| 2,150,507 | Kropa | Mar. 14, 1939 |
| 2,197,462 | Bent | Apr. 16, 1940 |
| 2,381,137 | Patnode et al. | Aug. 7, 1945 |
| 2,398,672 | Sauer | Apr. 16, 1946 |

FOREIGN PATENTS

| Number | Country | Date |
|---|---|---|
| 160,684 | Switzerland | June 1, 1933 |

OTHER REFERENCES

Uchida: Chemical Abstracts, vol. 27, page 3464 (1933).

Kalinin: Chemical Abstracts, vol. 32, page 6227 (1938).

Volnov: Chemical Abstracts, vol. 34, page 5048 (1940).

Kalinin: Chemical Abstracts, vol. 35, page 2470 (1941).

Backer et al.: Rec. Trav. Chim., vol. 61, pages 500–512 (1942).

Beilstein: Handbuch der Org. Chem., vol. 1, 4th ed., pages 334, 335.